United States Patent Office 3,282,435
Patented Nov. 1, 1966

3,282,435
CLAY FILTER AID AND PRODUCTION
THEREOF
Morris M. Goldberg, Brooklyn, N.Y., and Aldo P. Allegrini, Westfield, and Tom A. Cecil, Highland Park, N.J., assignors to Minerals & Chemicals Philipp Corporation, Menlo Park, N.J., a corporation of Maryland
No Drawing. Filed Oct. 15, 1963, Ser. No. 316,453
6 Claims. (Cl. 210—500)

This invention has to do with filter aid products and is directed especially to an improvement in the filter aid material that is made from clay by the general process of U.S. Patent No. 3,080,214 to James B. Duke and Ernest W. Greene.

Filtration is a widely used operation in the chemical industries and is basically a straining operation designed to remove suspended solids from a liquid. Filtration should be distinguished from decolorization operations in which liquids are treated with solid adsorbents which remove soluble color body impurities by a mechanism involving adsorption. A filter aid, which is a finely divided solid, may be precoated on the filter support and is usually also mixed with the liquid to be filtered. Filtration removes both the filter aid and foreign solids from the liquid, and the filter aid added with the liquid gradually forms a rigid, permeable incompressible cake on the filter cloth or screen. Fine solids originally suspended in the liquid are simultaneously entrained in the cake as it is built up and the porous nature of the cake prevents such solids from agglomerating and forming an impervious layer on the filter cloth or screen. Filtration of liquid through the porous bulky cake is thus more rapid and efficient than it would be in the absence of a filter aid.

In accordance with the teachings of U.S. Patent No. 3,080,214, a novel filter aid product, generally similar to the filiform type of ditomaceous earth is obtained from a particular type of clay, namely, attapulgite clay (Georgia-Florida fuller's earth), by a unique treatment of the clay that includes an essential wet processing step. Briefly, the process entails forming a dilute fluid dispersion of the colloidal form of attapulgite clay in an aqueous solution of a polyphosphate clay dispersing agent (deflocculating agent), thereby separating the clay into colloidally dimensioned needles. This dispersion is dried quiescently (i.e., without agitation or appreciable ebullience) until the clay dispersion has a solid consistency, and the dried dispersion is ground to a powdered state and calcined to eliminate water that is physically and chemically associated with the clay.

Filtration properties of the attapulgite clay filter aid product obtained by carrying out the above-described process under conditions heretofore considered to be optimum have compared favorably with the filtration properties of high grade diatomaceous earth filter aid products. For example, the flow rate index of the clay product has been generally similar to that of high grade flux calcined diatomaceous earth filter aid. The filter cake formed by the clay filter aid had about the same bulk density as the filter cake formed with the flux calcined diatomaceous earth. In other words, the depth of a filter cake of given area that is formed by a given weight of the attapulgite clay filter aid is about the same as the depth of the cake formed when the same weight of diatomaceous earth is used. In effect, the weight efficiency or unit covering power of the two filter aid products is generally the same.

An object of this invention is the provision of improved attapulgite clay filter aid products.

A specific object is the provision of attapulgite clay filter aid products which have markedly improved weight efficiency, i.e., which produce filter cakes of appreciably lower bulk density.

Another object is to achieve the foregoing objects without impairing other essential characteristics of the filter aid, especially without impairing flow rate.

Other objects and features will be apparent from the description of our invention which follows.

We have discovered a simple method or means for producing an attapulgite clay filter aid powder which forms a filter cake of remarkably low bulk density when said attapulgite clay filter aid material is employed in filtration operations, whereby the weight efficiency (unit covering power) of the filter aid product is markedly superior to that of high grade diatomaceous earth filter aid material as well as being remarkably superior to that of attapulgite clay filter aid material heretofore produced.

Stated briefly, in accordance with this invention, an attapulgite clay filter aid product of remarkably improved weight coverage, i.e., low wet bulk density, is produced when the defloculated aqueous slip of colloidal attapulgite clay which is dried quiescently, ground and calcined, as described in U.S. 3,080,214, is obtained by a specific hydroclassification treatment, viz., by forming a deflocculated aqueous slip of crude (unrefined) attapulgite clay usually containing about 15 to 22 percent clay solids, centrifuging said aqueous slip to separate it into a sedimented coarse fraction which is discarded and a deflocculated suspension of a fine fraction of the crude which is subsequently dried quiescently, ground and calcined. An essential feature of the invention resides in conducting the hydroclassification by means of a centrifuge, since the desired results are not obtained by screening or by settling. Another essential feature resides in centrifuging the deflocculated slip at an optimum clay solids level, which will vary somewhat from one clay crude to another. The desired improvement in filter aid cake density is not realized when the clay solids in the slip vary considerably from the optimum clay solids level which is within the range of 15 to 22 percent.

The improvement in filter aid properties of the clay product, especially the significant reduction in filter cake density, was surprising and unexpected since the reduction in density exceeded substantially any reduction that would have been predicted on the basis of the relatively small quantity of material removed during hydroclassification. The marked difference in reduction in cake density between filter aids obtained by hydroclassification by wet screening only as compared with hydroclassification by centrifuging was especially surprising since the small additional quantity of crude removed during centrifuging which was not removed by screening resulted in an exceptionally great reduction in cake density. An illustrative demonstration of this phenomenon is given in the accompanying example.

In accordance with a preferred embodiment of this invention, a "starvation" quantity of sodium polyphosphate and sodium hydroxide cooperative clay dispersing agents is used in preparing the deflocculated clay slip which is subsequently hydroclassified, dried, ground and calcined to prepare a filter aid. This quantity of clay dispersing agent is sufficient to form a slip of attapulgite clay which is fluid when readily prepared but which forms a thiuotropic gel upon standing without agitation. By thus limiting the quantity of clay dispersant employed in forming our slip of fractionated clay and present with the fractionated clay slip during drying and calcination, we have been able to obtain filter aid preparations that form filter cakes of exceptionally low bulk density. For example, the bulk density of a filter cake obtained from a minus 2.5 micron centrifuge effluent was reduced by 25 percent when the quantity of tetrasodium pyrophosphate dispersant present in the step during fractionation was reduced from 2.5 percent to 0.87 percent of the clay weight, calculated on a volatile free clay weight basis. This result was unexpected since the provision of low density filter aid products by the method of U.S. 3,080,214 necessitates the initial colloidal dispersion of the clay and a use of smaller quantities of a dispersant, insufficient to inhibit gelation, would have been expected to impair dispersion and produce an inferior result, not the markedly superior result which was actually obtained.

The starting clay used in our process is an attapulgite clay crude, i.e., raw Georgia-Florida fuller's earth as mined and refined only to the extent that it has been crushed. A chemical analysis of a typical crude is given in U.S. 3,080,214. The crude consists predominantly of the clay mineral attapulgite and contains quartz as the principal impurity, typically in amount of about 10 percent of the volatile free clay weight. Small amounts of calcite impurity are usually present as well as sepiolite and bentonite (montmorillonite) as colloidal clay impurities.

In putting this invention into practice, we initially agitate the crushed crude attapulgite clay in an aqueous solution containing a clay dispersing agent, preferably a mixture of tetrasodium pyrophosphate and sodium hydroxide. With a typical crude the optimum proportions of clay and dispersant solution are such as to form a slip of 20 percent clay solids content, i.e., twenty parts by weight volatile free clay to eighty parts by weight of total water in the system (including volatile matter associated with the clay). With other crudes optimum results may be obtained at somewhat higher or somewhat lower solids. As is known in the art, the formation of aqueous dispersions of our clay necessitates the use of high shear agitation. The preparation of the dispersion can be carried out at ambient temperature. Preferably we disperse the clay by agitating it in an aqueous solution of sodium polyphosphate and sodium hydroxide at an elevated temperature below which the solution has appreciable vapor pressure, e.g., a temperature within the range of from about 160° F. to about 185° F.

The optimum quantity of clay dispersant used in preparing the slip for hydroclassification will vary with clays of different origin. With most clays, the quantities of tetrasodium pyrophosphate and sodium hydroxide are, respectively, within the range of about 0.8 percent to 1.3 percent and 0.5 percent to 0.8 percent, based on the volatile free clay weight.

If desired, the hydroclassification can be carried out in two stages, with the first stage being a wet screening, as on a 325 mesh screen (44 microns) to eliminate so-called "grit." Following screening the slip is centrifuged at a speed and for a time calculated to cause all particles larger than about 2.5 microns to settle. Equally good results can be expected when the screening is omitted and all particle removal, including removal of plus 44 micron grit, is effected in the centrifuge. Batch centrifuges can be used for laboratory evaluation or the centrifuges can be effected on a continuous basis, as in a Bird Super-D-Canter. The screening and/or centrifuging can be carried out immediately after the clay dispersion is prepared. Equally good results can be expected when the clay slip is fractionated after the slip has aged and gelled. With a typical raw attapulgite clay, hydroclassification and separation of all plus 2.5 micron material removes a total of about 10 percent to 20 percent by weight of the starting clay. Consequently, the clay solids in the fractionated slip which is passed to the drying equipment will be somewhat less than the solids content of the starting slip. If desired, entrained clay can be separated and recovered from the remainder of the grit fraction and/or the centrifuge underflow by diluting such material with water and agitating the system to disperse the clay and permit its removal from nonclay matter.

At some period before the drying step, it is preferable to age the dispersed clay slip without agitation and without addition of heat for at least a day, preferably for about two to ten days, in order to obtain a filter aid product of optimum properties, especially optimum filter cake density.

The fractionated slip, preferably aged, is dried quiescently. On a commercial basis it is preferable to carry out the drying step on a drum dryer heated internally with steam and externally with hot air. Drying can be carried out by placing trays containing thin layers of the dispersion in an oven. Reference is made to U.S. 3,080,-214 as to suitable drying conditions.

As brought out in U.S. 3,080,214, the dried material is ground to about 100 percent minus 200 mesh in any suitable mill, such as a Mikro-Pulverizer (a high speed hammer mill), ball mill, roller mill or cage mill. The degree of fine grinding will be determined by the properties desired in the filter aid product. It is known that the clarity-flow rate correlation of filter aids varies with the particle size distribution of the filter aid and this property can be controlled at this point of the process. Thus, the material may be ground somewhat coarser than 200 mesh or somewhat finer, if desired.

The dried material is then calcined to a volatile matter content below 1 percent, usually at a temperature within the range of about 1500° F. to about 1800° F., depending upon the flow rate desired in the product.

The calcined product is classified to remove an undesirable coarse fraction.

Reference is made to U.S. Patent No. 3,080,214 as to a description of the chemical and physical nature of attapulgite clay suitable as a starting material in our process, and as to details of the preparation of deflocculated clay dispersions, quiescent drying, grinding and calcination to make a clay filter aid. Reference is also made to the following: U.S. Patent No. 3,050,863 to Aldo P. Allegrini and Tom A. Cecil as to details of the preferred method of drying said dispersions using a drum dryer which is heated internally with steam simultaneously while being heated externally with hot dry air; a copending application of Aldo P. Allegrini and Tom A. Cecil, Serial No. 38,753, filed June 27, 1960, now abandoned, as to the incorporation of sodium hydroxide into the polyphosphate deflocculated aqueous clay dispersion of U.S. 3,080,214; and a copending application of Aldo P. Allegrini and Tom A. Cecil, Serial No. 228,266, filed October 4, 1962, now U.S. 3,174,826, as to the aging of the clay dispersion of U.S. 3,080,214.

The following example is given to illustrate how the removal of all plus 2.5 micron material from a deflocculated aqueous slip of crude attapulgite clay decreases the filter cake density when the clay slip is processed by the method generally set forth in U.S. 3,080,214. The example also shows that the desired result is not obtained by removal of only plus 44 micron (325 mesh) material, leaving plus 2.5 minus 44 micron material in the clay slip. Also shown in the example is that optimum reduction in cake density is accomplished when "starvation" quantities of clay dispersant are used in forming the slip that is fractionated in accordance with this invention and then processed in accordance with the teachings of U.S. 3,080,214.

Samples of crude attapulgite clay from a mine near Attapulgus, Georgia, were dispersed in water in which was dissolved various quantities of tetrasodium pyrophosphate (TSPP) and sodium hydroxide. Two different clay crudes, designated "A" and "B," generally similar in chemical composition and particle size distribution, were used. The clay concentration in the dispersions varied between 18 percent and 22 percent clay solids. To disperse the clay, the clay was agitated in the solutions previously heated to 150° F. to 170° F. with a high speed mixer (Waring Blendor) until clay dispersion was completed. The freshly prepared dispersions were wet screened through a 325 mesh Tyler screen to remove plus 44 micron grit. In the case of Clay A it was found that the dried nondispersible (nonclay) portion of the grit that was retained on the sieve accounted for 13.6 percent of the volatile free weight of the crude. Portions of the minus 325 mesh slips were aged for about a day in a closed container and, without addition of reagents, the slips were centrifuged at 2500 r.p.m. for ten minutes, resulting in the formation of a dark sediment having a sandy consistency. Centrifuging was carried out under conditions such that, assuming a viscosity of 25 cp. in Stokes law, all plus 2.5 micron material was sedimented. In the case of Clay A, it was found that the plus 1 micron minus 44 micron dried sediment accounted for 1.9 percent of the volatile free weight of the crude from which it was obtained after the sediment had been washed to remove small quantities of adherent clay.

The liquid slips were poured out of the centrifuge and placed in a layer about ½ inch deep in a porcelain tray. In like manner, fractions of the slips before and after screening through a 325 mesh screen were placed in trays for drying. The trays were placed in an oven at a temperature of about 200° F. and dried to a free moisture content of about 20 percent. The dried slips were pulverized to about 90 percent minus 200 mesh (Tyler) in a high speed hammer mill (Mikro-Pulverizer) equipped with a whizzer classifier and the minus 200 mesh material calcined in a muffle furnace at 1680° F. for forty minutes. The calcined material was sifted over a 200 mesh screen to recover the 200 mesh filter aid product.

A mixture containing 10 percent raw sugar and 90 percent refined sugar was dissolved in sufficient water to produce a 46–47° Brix solution. The filter aid was then added at a 1.33 percent weight dosage to the solution and the contents heated to 100° F. This slurry was then poured into the bomb filter. The bomb was capped and immediately pressurized with nitrogen to 50 p.s.i.g. before opening the flow discharge valve. The discharge valve was opened one minute after charging the solution. The filtrate volumes and corresponding time intervals were measured and recorded. The flow rate was calculated from the time required for 500 cc. of solution to flow through the filter aid.

The absolute flow rate values were converted to index values compared with the corresponding values determined by tests made on the standard diatomaceous earth filter aid product and were determined by assigning the absolute flow rate of the standard diatomaceous earth filter aid product the index value of 100.

To evaluate wet bulk density, filter cake thickness was determined by measuring the height of the air-dried filter cakes after use in filtering the sugar solution. Inasmuch as the diameter of the filter cakes obtained in the filtration test bomb were constant and equal weights of filter aid samples were used in the tests, cake thickness varied inversely with low wet bulk density. Therefore, materials which provided thicker cakes had lower wet bulk density than products which formed thinner cakes.

The results are summarized in the following table.

TABLE

*Conditions for preparation of filter aids of optimum properties*

CRUDE CLAY "A"

| Sample No. | Processing Conditions | | | | Filter Aid Properties | | | Comments |
| --- | --- | --- | --- | --- | --- | --- | --- | --- |
| | Dispersant | | | Material Removed From Clay Dispersion | Flow Rate Index | Filter Cake | | |
| | TSPP, Percent [1] | NaOH, Percent [1] | Clay Solids, Percent [2] | | | Density, lb./ft.[3] | Height, 1/16 | |
| (1) | 0.87 | 0.74 | 20 | None | 106 | 18.8 | 14 | |
| (2) | 0.87 | 0.74 | 20 | +44 microns | 84 | 17.0 | 15½ | |
| (3) | 0.87 | 0.74 | 20 | +2.5 microns | 108 | 16.0 | 16½ | Optimum for Clay "A." |
| (4) | 1.00 | 0.75 | 20 | +44 microns | 77 | 20.3 | 13 | Tests illustrating effect of variation in dispersant quantity. |
| (5) | 1.00 | 0.75 | 20 | +2.5 microns | 97 | 18.2 | 14½ | |
| (6) | 2.50 | 0.75 | 20 | +44 microns | 128 | 22.9 | 11½ | |
| (7) | 2.50 | 0.75 | 20 | +2.5 microns | 125 | 22.0 | 12 | |
| (8) | 0.87 | 0.74 | 18 | +2.5 microns | 95 | 18.8 | 14 | Tests illustrating effect of variation of clay solids in "wet processing." |
| (9) | 0.87 | 0.74 | 22 | +2.5 microns | 108 | 18.2 | 14½ | |

CRUDE CLAY "B"

| (10) | 1.00 | 1.00 | 20 | +2.5 microns | 68 | 19.5 | 13½ | Optimum for Clay "B." |
| --- | --- | --- | --- | --- | --- | --- | --- | --- |
| (11) | 1.00 | 0.75 | 20 | +2.5 microns | 98 | 21.1 | 12½ | |
| (12) | 2.00 | 0.50 | 20 | +44 microns | 129 | 22.9 | 11½ | |
| (13) | 2.00 | 0.50 | 20 | +2.5 microns | 116 | 25.1 | 10½ | |

[1] Percent, based on volatile free clay weight.

[2] Percent clay solids = $\dfrac{\text{Volatile free clay weight}}{\text{Total water (inclu. volatile matter in clay)} + \text{volatile free clay weight}} \times 100$ To evaluate the usefulness of each sample as a filter aid material, filtration rate (flow rate) value of each sample was evaluated and compared to the flow rate of a commercial flux calcined diatomaceous earth filter aid (HyFlo Super-Cel). Also compared were the wet bulk density of the products, as indicated by properties of the filter cake, especially filter cake thickness.

In the examples the flow rate testing was performed in a bomb filter test unit. The unit consisted of a vertical metal tube flanged at the bottom so that it could be bolted to a horizontal circular filter plate which supported a filter cloth and had a vertical opening through the center to permit fluid flow. A discharge valve with a threaded end was screwed to the underside of the filter plate. The filter area was 1.0 square inch. The tube assembly was enclosed in a circulating heated oil both for temperature control.

Data in the table for Clay A and for Clay B show that at all dispersant concentrations, filter cake density was reduced by from about 1 to 2 lb./ft.³ without substantially adversely affecting flow rate by fractionating the clay at 2.5 microns instead of at 44 microns.

The data show that for Clay A optimum dispersant dosage was 0.87 percent TSPP and 0.74 percent sodium hydroxide (Sample No. 3) in which case a filter cake having an extremely low density of 16.0 lb./ft.³ was formed. The cake was 2.8 lb./ft.³ lower in density than the cake obtained from unfractionated clay with the same dispersant dosage (Sample No. 1). Such result was unexpected since, as shown hereinabove, the dense nonclay portion of the minus 2.5 plus 44 micron material represented only 14 percent by weight of the plus 44 micron material. Since removal of the plus 44 micron material reduced filter cake density by 1.3 lb./ft.³, it was expected that removal of minus 2.5 plus 44 micron material would further reduce cake density by 0.18 lb./ft.³ (14 percent×1.3 lb./ft.³). The actual further reduction of 1.0 lb./ft.³ to produce the 16.0 lb./ft.³ density was about six times more than was expected.

The increase was even greater with Clay B and optimum dispersant dosage for that clay in which case cake density was decreased by 2.2 lb./ft.³ by removing minus 2.5 plus 44 mesh material (compare Samples 12 and 13).

Data for filter aid preparations made from Clay A with clay concentrations of 18 percent and 22 percent in the hydraulic classification step at optimum dispersant concentration were compared with the filter aids made at 20 percent solids (Samples 3, 8 and 9). The comparison showed that the filter cake density was 2.2 lb./ft.³ less at 20 percent solids than it was at 22 percent solids and 2.8 lb./ft.³ less at 20 percent solids than it was at 18 percent solids. A comparison of Samples 8 and 9 with Sample 1 made with optimum dispersant quantity and at 20 percent solids without any fractionation show that Sample 1 was at least as good as Samples 8 and 9 which were made with centrifuge effluent. These data therefore demonstrate the necessity for maintaining the clay solids in the charge to the hydroclassification equipment close to the 20 percent level for this particular attapulgite clay crude.

The term "volatile matter" as used herein refers to the weight percent of a material eliminated when the material is heated substantially to constant weight at about 1800° F. In the case of raw clay, volatile matter is essentially water. The term "free moisture" as used herein refers to the weight percent of a material eliminated when the material is heated substantially to constant weight at 225° F.

All minus 44 micron size particle dimensions mentioned in the specification and claims refer to values determined by applying Stokes law to specimens subjected to centrifugal sedimentation, and assuming a viscosity value of 25 centipoises.

We claim:
1. In a method for making a filter aid powder from attapulgite clay wherein a small amount colloidal attapulgite clay is strongly agitated in an aqueous solution of a polyphosphate dispersing agent to form a deflocculated clay slip and the slip is dried quiescently, ground and then calcined to dehydrate the clay, the improvement which comprises centrifuging the deflocculated slip at 15 percent to 22 percent clay solids at a speed and for a time sufficient to effect a separation of the slip into a finer suspended fraction containing particles substantially all of which are finer than 2.5 microns, and into a fraction containing larger particles, separating the fractions, discarding said fraction containing larger particles and subjecting said finer suspended fraction to said quiescent drying, grinding and calcining.

2. A process of treating attapulgite clay to provide a low bulk density filter aid product therefrom which comprises strongly agitating sufficient crude attapulgite clay in a dilute aqueous solution of a mixture of sodium hydroxide and tetrasodium pyrophosphate to form a dispersed slip containing 15 percent to 22 percent clay solids, on a volatile free clay basis, said sodium hydroxide being used in amount with the range of about 0.5 percent to 0.8 percent of the volatile free clay weight and said tetrasodium pyrophosphate being used in amount within the range of about 0.8 percent to 1.3 percent of the volatile free clay weight, aging said dispersion for at least a day without agitation before said dispersion is dried and centrifuging said dispersion to effect a separation of the dispersion into a fine suspended fraction containing particles substantially all of which are finer than 2.5 microns and into a fraction containing larger particles, separating the fractions, discarding said fraction containing larger particles, quiescently drying said finer suspended fraction to a solid consistency, grinding the dried finer suspended fraction to powdered condition, and calcining the powder at a temperature within the range of about 1500° F. to about 1800° F.

3. The filter aid product obtained by the process of claim 2.

4. The method of claim 1 wherein said discarded fraction is agitated with water, and clay in said discarded fraction is removed from nonclay matter therein.

5. In a method for making a filter aid powder from attapulgite clay wherein a small amount of colloidal attapulgite clay is agitated in an aqueous solution of a sodium polyphosphate dispersing agent to form a fluid deflocculated clay slip and the slip is dried quiescently, ground and then calcined to dehydrate the clay, the improvement which comprises centrifuging the deflocculated slip at a speed and for a time sufficient to effect a separation of the slip into a finer suspended fraction containing particles substantially all of which are finer than 2.5 microns and into a fraction containing larger particles, discarding said fraction containing larger particles and subjecting said finer suspended fraction to said quiescent drying, grinding and calcining.

6. A process of treating attapulgite clay to provide a low bulk density filter aid product therefrom which comprises strongly agitating sufficient crude attapulgite clay in a dilute aqueous solution of a mixture of sodium hydroxide and tetrasodium pyrophosphate to form a ffuid dispersed slip, said sodium hydroxide being used in amount within the range of about 0.5 percent to 0.8 percent of the volatile free clay weight and said tetrasodium pyrophosphate being used in amount within the range of about 0.8 percent to 1.3 percent of the volatile free clay weight, aging said dispersion for at least a day without agitation before said dispersion is dried and centrifuging said dispersion to effect a separation of the dispersion into a fine suspended fraction containing particles substantially all of which are finer than 2.5 microns and into a fraction containing larger particles, separating the fractions, discarding said fraction containing larger particles, quiescently drying said finer suspended fraction to a solid consistency, grinding the dried finer suspended fraction to powdered condition, and calcining the powder at a temperature within the range of about 1500° F. to about 1800° F.

References Cited by the Examiner
UNITED STATES PATENTS

| | | | |
|---|---|---|---|
| 3,012,050 | 12/1961 | Fox et al. | 23—110 X |
| 3,080,214 | 3/1963 | Duke et al. | 210—502 X |
| 3,150,835 | 9/1964 | Horton | 23—110 X |
| 3,174,826 | 3/1965 | Allegrini et al. | 210—502 X |

LEON D. ROSDOL, *Primary Examiner.*

ALBERT T. MEYERS, *Examiner.*

M. WEINBLATT, *Assistant Examiner.*